United States Patent [19]

Keith

[11] 3,972,466
[45] Aug. 3, 1976

[54] HIGH TEMPERATURE WELDING BACKUP STRIP

[75] Inventor: Roger H. Keith, White Bear Lake, Minn.

[73] Assignee: Minnesota Mining and Manufacturing Company, St. Paul, Minn.

[22] Filed: Apr. 15, 1975

[21] Appl. No.: 568,259

[52] U.S. Cl. .................................. 228/216; 228/50
[51] Int. Cl.² ........................................... B23K 9/02
[58] Field of Search ............................. 228/50, 216

[56] References Cited
UNITED STATES PATENTS

| | | | |
|---|---|---|---|
| 2,362,505 | 11/1944 | Smith | 228/50 |
| 2,820,427 | 1/1958 | Chyle et al. | 228/50 |
| 3,235,323 | 2/1966 | Peters | 8/189 |
| 3,365,566 | 1/1968 | Kuder | 228/50 |
| 3,494,020 | 2/1970 | Cornell | 228/216 |

FOREIGN PATENTS OR APPLICATIONS

| | | | |
|---|---|---|---|
| 22,597 | 1/1962 | Germany | 228/50 |
| 817,699 | 8/1959 | United Kingdom | 228/50 |

*Primary Examiner*—Al Lawrence Smith
*Assistant Examiner*—K. J. Ramsey
*Attorney, Agent, or Firm*—Alexander, Sell, Steldt & DeLaHunt

[57] ABSTRACT

The tendency of molten weld metal to burn through a supported refractory welding backup material is greatly reduced by incorporating a woven carbon fiber cloth between the refractory and the support. A preferred product is a pressure-sensitive adhesive tape construction incorporating the carbon-fiber cloth in the backing; surprisingly, the carbon does not embrittle the weld.

11 Claims, 3 Drawing Figures

HIGH TEMPERATURE WELDING BACKUP STRIP

BACKGROUND OF THE INVENTION

This invention relates to welding methods and to novel backup equipment for use therein; the invention is particularly concerned with a novel pressure-sensitive adhesive tape for use in backing up abutted metal strips during formation of a weld.

In the manufacture of large tanks, ships, etc., plates are often joined together by abutting their edges and joining them with a welded seam. It is highly desirable, if not absolutely essential, that there be a complete penetration from face to root of the weld material. In order to permit welding from one side of the abutted plates, it has been common practice to employ metal back-up bars, which may be surfaced with glass cloth or other refractory material to prevent inadvertently joining the backup bar to the weld.

It has also been common, in recent years, to employ heat-resistant tapes, such as glass fabric tapes, either alone or in combination with a further backing such as a metal or ceramic ply. Another extremely popular welding backup tape incorporates a flexible backing coated with adhesive, a strip of flexible refractory particles being adhered to a central portion of the coated side of the backing; such a tape is then adhered to the portions of the plates to be welded which are immediately adjacent to the plane of abutment.

While both backup bars and flexible backup tapes have been used effectively in industry, certain types of welding situations continue to plague the welders. For example, where the parts to be joined have irregular edges and hence vary in gap, or where the current flow to the arc welder tends to fluctuate, localized overheating is likely to occur. In such circumstances, it frequently happens that the refractory material fuses completely and permits a channel of the molten weld metal to flow through. Where a backup bar is employed, such an occurrence may cause the bar itself to become welded to the joint, necessitating inconvenient, expensive, and time-consuming effort to separate it therefrom. On the other hand, where flexible backup tape is employed, burning through the backing may cause the development of an irregular weld which must be ground down after the welding process is completed. This procedure, too, is extremely expensive and inconvenient.

Welding conditions of the type just described are particularly common where large plates or other parts are to be welded together, as occurs in the construction of large storage tanks, units of a ship, etc. Since such equipment is extremely costly, and since it will be subjected to severe operating conditions, it is important that uniform and structurally sound welds be obtained. Prior to the present invention, however, no means was recognized for achieving this objective.

SUMMARY OF THE INVENTION

The present invention provides a surprisingly simple solution to the problem of obtaining structurally sound and uniform butt welds under field conditions, i.e., where the temperature of the weld is likely to be extremely high in localized areas. The invention utilizes a novel arrangement for backing up the line of abutment along which welding occurs, constituting an improvement over conventional technique in which refractory material in immediate contact with the molten weld material is supported by a backing member such as a flexible sheet or a rigid backup bar.

In accordance with the invention, a carbon fabric is interposed between the refractory material and the backing member. The carbon fabric serves to prevent passage of molten weld material, apparently for several reasons. It appears, for example, that part of the refractory material may melt and plug the pores of the carbon fabric, thus preventing passage of the molten weld material. It also appears that the molten weld material does not wet the carbon fabric and hence does not readily pass through it.

While the high temperature resistance of carbon fabrics is known, the use of such fabrics in welding procedures goes contrary to the experience of the industry. Because welds occupy a comparatively small part of the workpieces being joined, they tend to cool rapidly and to develop highly brittle martensite. It has been found that the use of carbon electrodes in welding tends to introduce carbon into the weld material and further embrittle it since high carbon content promotes martensitic formation. Prior attempts to use carbon blocks to back up welds have met with the same unfortunate embrittling effect and have been discontinued. Indeed, welding backup tapes which employ refractory particles in an organic binder for contacting weld surfaces have generally found it essential to incorporate a carbon scavenger to prevent embrittlement of the weld from the minute amount of organic material present.

In its simplest form, the present invention contemplates a backing formed of carbon fabric and bearing on one face a layer of refractory material such as glass cloth, refractory particles, etc., forming a surface to accept the weld metal. For many purposes, it is considered desirable to have a somewhat more sophisticated backing which includes, in addition to the carbon fabric, a layer of glass cloth to impart additional strength (and, upon fusing, to plug the carbon fabric pores), a crepe paper or metal foil carrier, or combinations of such components.

Where a metal backup bar is used, it has been found that good results are obtained by merely adhering the carbon fabric to the backup bar and superposing a layer of glass cloth or other refractory material for directly contacting the weld surface, the refractory material being replaced after each completed weld, and the carbon fabric being reused for many successive welding operations.

DESCRIPTION OF THE DRAWING

Understanding of the invention will be facilitated by reference to the accompanying drawings, in which.

DETAILED DESCRIPTION

Figure 1:
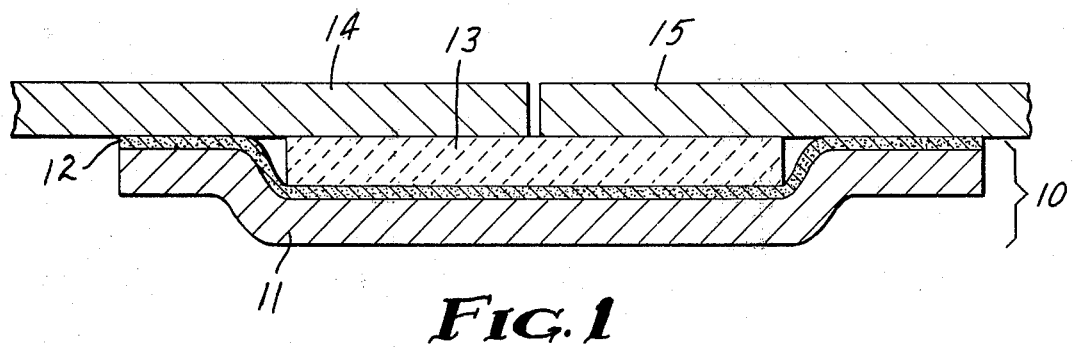
FIG. 1 is a cross-sectional view showing two abutted pieces of metal which are to be welded, one form of the present invention spanning the line of abutment.

In the drawings, FIG. 1 illustrates a comparatively simple form of the invention. Pressure-sensitive adhesive-coated welding backup tape 10 comprises backing 11, which is formed of a woven carbon cloth. As used throughout this description, the term "carbon cloth" is intended to embrace those types of structure which may contain from 55 to nearly 100% carbon, such as are commonly formed by heating rayon cloth which has first been saturated with nitrogenous or other salt and then pyrolyzed; see, e.g., U.S. Pat. Nos. 3,235,323 and 3,484,183, the disclosures of which are incorporated herein by reference. Coated over one face of backing 11 is normally tacky and pressure-sensitive adhesive layer 12. The specific nature of this adhesive is not especially critical, although it has been found advantageous to use silicone-based adhesives where extremely high temperature resistance is important. Medially located along pressure-sensitive adhesive layer 12 is narrower refractory layer 13, which, in the specific embodiment depicted in FIG. 1, is a glass cloth. Tape structure 10 is shown adhered in position along the line of abutment between workpieces 14 and 15, which are to be butt welded together.

Figure 2:
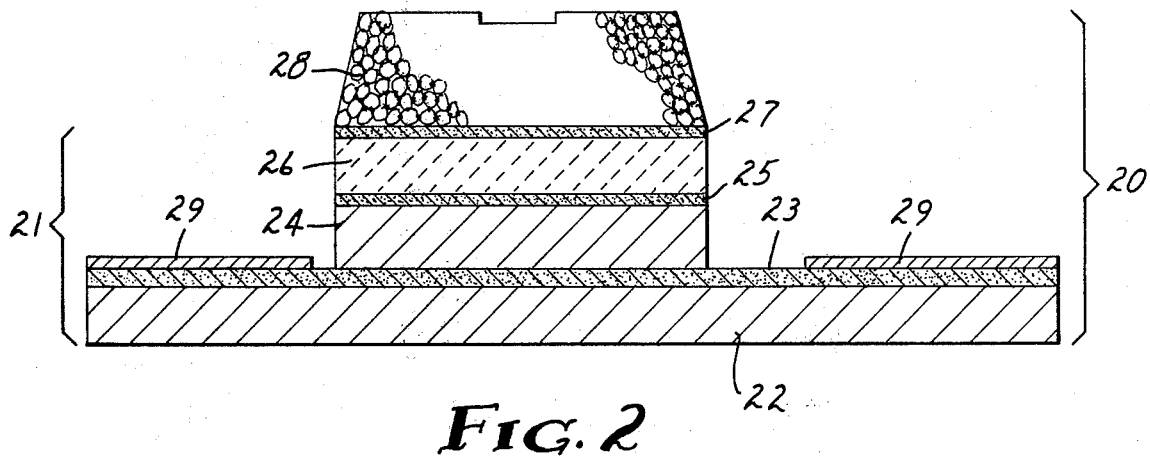
FIG. 2 is a cross-sectional view of a presently preferred embodiment of the invention.
Figure 3:
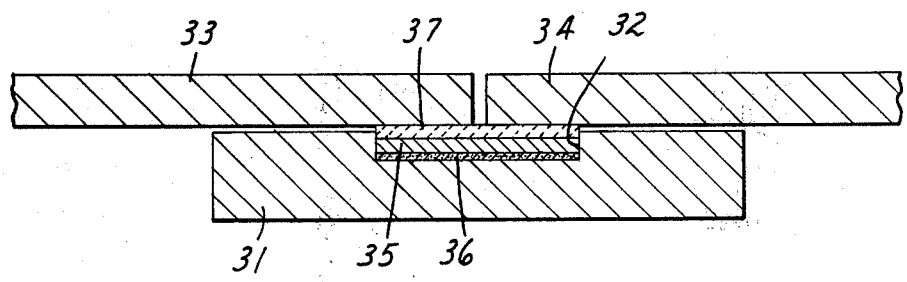
FIG. 3 is a cross-sectional view similar to FIG. 1, showing abutted metal plates which are to be welded, with an embodiment of the invention used in connection with a backup bar.

FIG. 2 depicts a somewhat more sophisticated form of the tape made in accordance with the present invention. In this figure, tape 20 comprises backing 21, which in turn is made up of 3 separate layers laminated together. Backing 21 comprises metal foil 22, having a normally tacky and pressure-sensitive coating 23 along the upper face thereof. Medially located along foil strip 22 is woven carbon cloth 24, to the upper surface of which is applied adhesive layer 25, in turn being joined to glass cloth layer 26. Coated on the upper surface of glass layer 26 is adhesive layer 27, refractory layer 28 being adherently bonded thereto. In this instance, refractory layer 28 constitutes refractory particles such as aluminum oxide, glass, mixtures thereof, etc. blended with a minimal amount of adhesive which is just sufficient to maintain the integrity of layer 28. Pressure-sensitive adhesive coating 23 may be protected by liners 29 which are removed before application of the tape to the joint to be welded. Tape 20 is employed in the same manner as tape 10, providing even greater insurance against "burn-through."

Where work is repetitive in nature, welders still find it convenient to use backup bars. FIG. 3 illustrates a means of incorporating the present invention into such an application. Metal weld backup bar 31 optionally has channel 32 extending longitudinally down the central portion of its upper face. Positioned centrally on backup bar 31 (in channel 32, if such is present) is woven carbon cloth 35, preferably bonded to central portion of backup bar 31 by adhesive 36. Positioned above carbon cloth 35 is a layer of refractory material 37, in this instance depicted as aluminum oxide fibers, although layers of glass cloth, a refractory layer of the type shown in FIG. 2, or combinations thereof might also be employed. Backup bar 31 is clamped firmly over the line of abutment between metal workpieces 33 and 34 which are to be welded together. This arrangement permits welding to occur while obviating the possibility that molten weld material can strike through to contact the base of channel 32 and thus inadvertently weld workpieces 33 and 34 to backup bar 31.

DESCRIPTION OF PRESENTLY PREFERRED EMBODIMENTS

Understanding of the invention will be further facilitated by discussion of presently preferred embodiments, which are intended to be purely illustrative and not to be considered in a limiting sense.

EXAMPLE 1

A plain weave spun viscose rayon yarn fabric having 22 warp yarns and 24 fill yarns per inch (respectively about 8.7 and 9.4 yarns per centimeter), a thickness of 26 to 30 mils (about 0.6–0.7 mm) and weighing 12 ounces per square yard (about 240 gm/m$^2$), was treated with an aqueous solution of nitrogenous salt, dried, and heated at 450°–525°F. (about 230°–275°C.) for 12 – 15 minutes, all as described in detail in U.S. Pat. No. 3,235,323, the disclosure of which is incorporated herein by reference. The ultimate cloth was strong, flexible, resilient, and black, having a carbon content of about 55%, with tensile strength in the warp and fill directions of, respectively, about 45 and 30 lbs. per inch (8 and 4.5 kg/cm) of width.

The carbon cloth just described was reverse-roll coated on one side with a polyvinyl chloride plastisol, as further described in the aforementioned U.S. Pat. No. 3,235,323. The opposite surface of the carbon cloth was then provided with a normally tacky and pressure-sensitive silicone adhesive, for example as described in U.S. Pat. No. 3,372,852.

An aluminum foil backing tape was formed by coating 3-mil (about 75-micron) thick soft aluminum foil with a pressure-sensitive adhesive formed from a mixture of styrene-butadiene rubber and a 95.5:4.5 isooctylacrylate:acrylic acid copolymer. A 1-inch (2.5-cm) wide strip of the adhesive-coated carbon cloth was then positioned, adhesive side outward, along the middle of a 2-inch (about 5-cm) wide strip of the adhesive-coated aluminum foil. On the exposed adhesive-coated surface of the carbon fiber was then adhered a woven glass fabric cloth tape, which in turn had a pressure-sensitive adhesive on the exposed outer surface. An extruded refractory strip, approximately ⅜ inch (about 10 mm) thick and 1 inch (about 2.5 cm) wide, was then adhered to the exposed pressure-sensitive adhesive on the glass cloth. This refractory strip comprised approximately 400-micron particles of fused aluminum oxide and glass cullet of a comparable size, lightly bonded together with a polyisobutylene adhesive (constituting about 10% by weight of the total strip) and containing ammonium nitrate as a carbon scavenger. Refractory layers of this type are described in more detail in the aforementioned U.S. Pat. No. 3,494,020. Until the backup strip is actually to be used, a strip of removable liner is desirably applied over each of the exposed pressure-sensitive adhesive-coated areas along the foil backing. When the liner strips are removed and the tape of this example is adhered in position along the abutted edges of two workpieces to be welded, there is no "burn-through", even when the edges are extremely irregular or when the welding current varies markedly.

As previously indicated, the foregoing description is not intended to be exhaustive of all possible tape constructions or applications of the principles disclosed in the present invention, and it is expected that those skilled in the art will readily adapt the invention to suit specific needs. It is believed useful, however, to suggest ways in which the invention might be modified to achieve desired results, as will now be indicated.

While it is convenient to use normally tacky and pressure-sensitive adhesives for preparing the various plies of backing material, thermoplastic or solvent-activated adhesives may likewise be employed. Indeed, it is entirely possible to join plies of a compound backing together by sewing or stapling along the marginal edges to minimize manufacturing cost.

Where woven glass fabric has been disclosed in constructions, suitable replacements include thin asbestos sheets or boards. Similarly, papers can be formed of glass fibers either alone or in combination with such other refractory materials as magnesite, gypsum, alumina-silica fiber or powder, asbestos, rock wool, etc. Likewise, although somewhat more bulky, mats of fiberglass, rock wool, etc. may be employed.

Another substitute for glass cloth which may be used in the present invention is a more or less conventional coated abrasive construction in which silicon carbide particles having an effective diameter in the range of 100–500 microns are bonded to a suitable backing sheet.

What is claimed is as follows:

1. In a welding backup tape capable of being wound in roll form convolutely about a core, comprising a narrow, elongate flexible sheet backing having, joined to one face thereof, a layer of refractory material for spanning the joint between two abutted pieces to be welded and being held in position during the welding operation to support the weld material, the improvement which comprises utilizing as at least part of said backing a woven carbon fiber cloth, whereby said tape resists extremely high welding temperature without burning through said backing.

2. The tape of claim 1 wherein the layer of refractory material consists essentially of glass.

3. The tape of claim 2 wherein the glass is in fibrous form.

4. The tape of claim 2 wherein the glass is in the form of a woven fabric.

5. The tape of claim 1 wherein the layer of refractory material consists essentially of inorganic particles bonded together with a minor amount of flexible organic binder, said layer being adhered to said one face of the backing.

6. The tape of claim 5 wherein the backing comprises an adhesively joined laminate of woven glass cloth and woven carbon fiber cloth, the inorganic particles being bonded to the exposed face of the glass cloth; said glass cloth imparting additional strength to facilitate handling of the tape.

7. The tape of claim 6 wherein the backing includes an additional ply of sheet material is adhered to the back of the carbon fiber cloth.

8. The tape of claim 7 wherein the additional ply of sheet material is creped paper.

9. The tape of claim 7 wherein the additional ply of sheet material is aluminum foil, said foil extending laterally beyond both edges of the remainder of said tape and being provided on the extended surfaces, with a tacky and pressure-sensitive tape to facilitate mounting on each of the abutted pieces to be welded.

10. The tape of claim 1 wherein the surface of said backing which is opposite the surface to which the layer of refractory material is joined, is provided with a layer of adhesive to facilitate attachment to a metal backup bar.

11. In the method of welding abutted metal workpieces which comprises spanning the joint between the workpieces with a layer of refractory material supported by a metal carrier, the improvement which comprises interposing a carbon fabric between the refractory material and the metal carrier, whereby the carbon fabric prevents contact between the molten weld material and the metal carrier.

* * * * *